United States Patent
Prescott

[11] 3,842,717
[45] Oct. 22, 1974

[54] PISTON SEAL
[75] Inventor: Norman F. Prescott, Wenham, Mass.
[73] Assignee: Atwood & Morrill Co., Salem, Mass.
[22] Filed: June 21, 1973
[21] Appl. No.: 372,381

[52] U.S. Cl. ............................. 92/162 R, 92/250
[51] Int. Cl. .......................... F01b 31/00, F16j 9/00
[58] Field of Search... 92/162 R, 162 P, 181, 181 P, 92/182, 249, 250, DIG. 1, DIG. 2

[56] References Cited
UNITED STATES PATENTS

| 892,194 | 6/1908 | Stewart | 92/162 R |
|---|---|---|---|
| 1,714,482 | 5/1929 | Schmuziger | 92/181 R |
| 2,711,157 | 6/1955 | Halward | 92/162 R |
| 3,085,515 | 4/1963 | Workman | 92/182 |
| 3,448,665 | 6/1969 | Allinquort | 92/250 |

Primary Examiner—Paul E. Maslousky
Attorney, Agent, or Firm—John E. Wilson; Marvin A. Naigur

[57] ABSTRACT

A piston which moves over a portion of its stroke without contacting the cylinder wall and then seals over the remainder of its stroke. The piston is mounted within a cylinder which over a portion of its length is of an inside diameter large enough that there is a gap between the cylinder wall and the seal ring and which over the remainder of its length is of a diameter small enough that the piston seals when moving over the remaining portion and has a seal ring flared to sealingly engage against the cylinder wall where it is of the smaller diameter.

5 Claims, 3 Drawing Figures

PISTON SEAL

BACKGROUND OF THE INVENTION

There are several applications for a cylinder and piston combination where the piston moves through the cylinder without contacting the cylinder, that is, while allowing a certain amount of leakage, and then, at a portion of its stroke, seals with the cylinder. An example is in an automatic shut-off valve which is placed between a steam generator and a header which is fed by several steam generators to provide steam for a turbine. In the event of a failure in the line between the shut-off valve and the steam generator, a valve member is moved against a valve seat to seal against pressure between the valve and the header. The movement of the valve member against its seat and against pressure is often assisted by the use of a piston actuated by steam fed from the line between the valve and the header.

It has been found that conventionally fitted pistons with rings, sometimes fail to operate when required, due to the fact that the piston rings cannot slide over the cylinder wall because of rust or other deterioration which has occurred over a long period of inactivity. Some sealing device must be provided, however, if the steam under pressure between the valve and the header is to be contained.

SUMMARY OF THE INVENTION

It is an object of the present invention to overcome drawbacks found in the prior art such as those discussed above. Accordingly, a cylinder and piston are provided where the cylinder, over a portion of its length, is of a diameter which allows leakage between the piston and the cylinder wall and over the remaining portion of its length is of a smaller diameter which permits the piston seal ring to engage against the cylinder wall to materially reduce such leakage. The seal ring is flared outwardly so that it flexes outward under the action of the fluid pressure acting against the face of the piston.

DESCRIPTION OF THE PREFERRED EMBODIMENT

Figure 1:
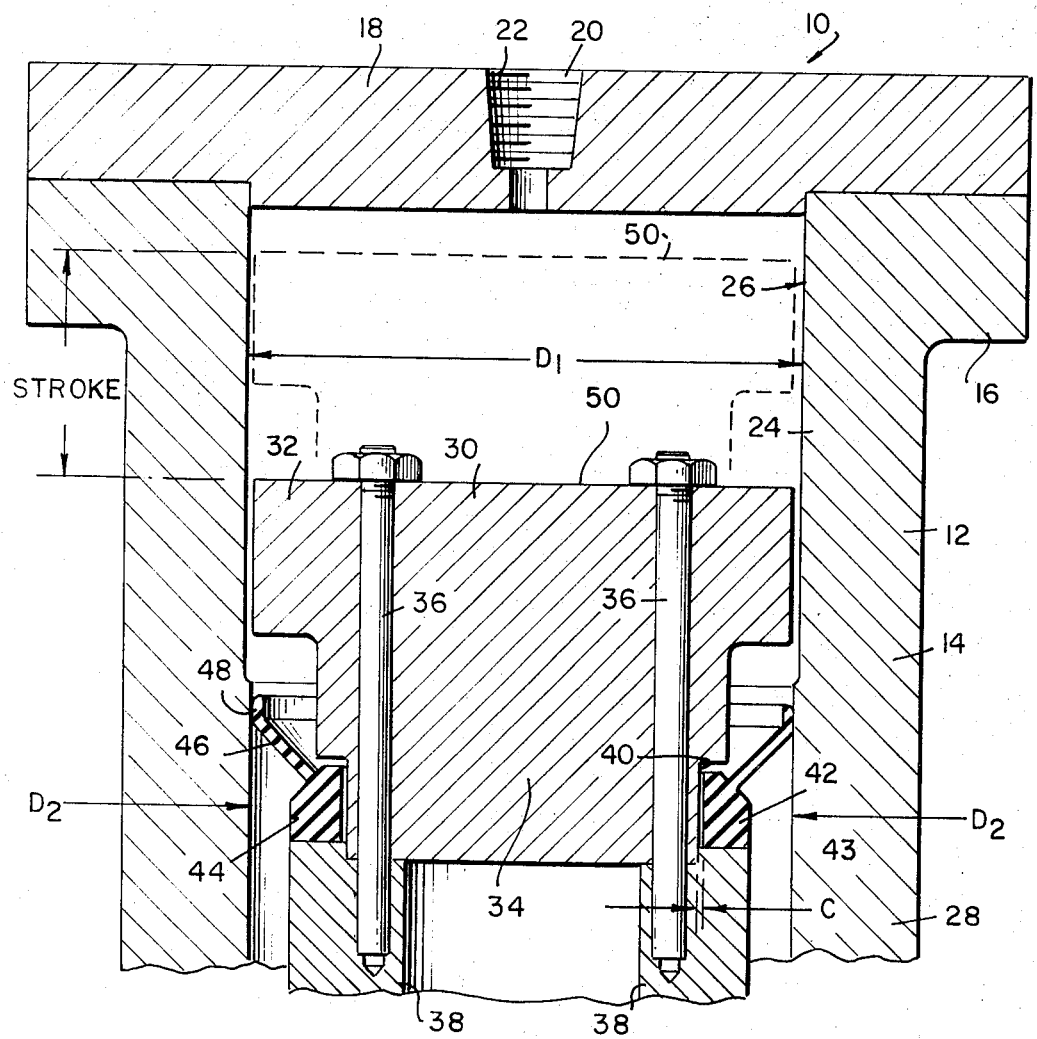
FIG. 1 is a fragmentary view partly in section of a piston and cylinder made in accordance with the present invention.

The cylinder and piston combination which is shown in FIG. 1 is indicated generally as 10. It includes a cylinder 12 which includes a cylinder block or sleeve 14 having at its top an outwardly extending flange 16 and a cylinder head 18 secured to the flange. A fluid inlet 20 is provided in the cylinder head and has threads 22 which allow a fluid line to be coupled to the cylinder head 18 to feed fluid under pressure into the cylinder.

The cylinder wall 24 has two portions. An upper portion 26 is of a diameter $D_1$, whereas a lower portion 28 is of a diameter $D_2$ which is smaller than the diameter $D_1$.

Within the cylinder 12 is a piston 30 which has an upper portion 32 of a diameter slightly less than $D_1$ and a lower portion 34 which is of a diameter even less than that of the upper portion 32. The piston 30 is secured by bolts 36 to a cylindrical piston rod 38 which can reciprocate only along its longitudinal axis.

The lower portion 34 includes an annular groove 40 in which is positioned a seal ring 42. The seal ring 42 is of a slightly larger diameter than the inside diameter of the groove 40 to create a gap C between the piston seal and the annular groove 40. The groove 40 is closed along its lower side by the top surface 43 of the cylindrical piston rod 38 as shown. The groove 40 is wide enough to permit the seal ring 42 to move laterally without binding, that is, as much as is permissible by reason of the gap C.

The seal ring 42 includes a body portion 44 and an outwardly flared web section 46 which terminates at its outer periphery at a sealing surface 48. The sealing surface 48 rides against the cylinder wall over the lower portion 28 of the cylinder 12. However, because the seal ring 42 at the sealing surface 48 is of an outside diameter which is less than the inside diameter $D_1$ of the upper portion 26 of the cylinder 12, it will not seal with the cylinder wall when traveling over the upper portion 26. The seal ring 42 is preferably made from a suitably flexible metal.

In operation, when the piston 30 is at the top of its stroke so that its top or face 50 is in the dotted line position, the piston can be moved downwardly by a fluid such as steam entering through the fluid inlet 20. It is possible that the piston movement would be caused primarily by a force on the piston rod 38 but even in that case it is necessary to let the steam or other fluid in through an inlet 20. As the piston 30 moves downward, any excessive friction such as that caused by an accumulation of rust on the cylinder wall 24 and/or seal ring 42 would not prevent the piston from moving because the seal ring 42 does not contact the cylinder wall 24 as it moves over the upper portion thereof.

The piston continues downward until the sealing surface 48 contacts the lower portion 28 of the cylinder wall 24. The pressure exerted on the seal 42 by fluid above the seal 42 tends to push the flanged section 46 of the seal 42 outward to provide for a seal over the lower portion of the stroke. This is so because the sealing surface 48 is connected to the body portion 44 by a web which extends outward and toward the pressure side of the piston 30. Steam flow tending to escape past clearance "C" is prevented from doing so because of the forced intimate contact between the bottom face of 42 and to top surface 43 of the cylindrical piston rod 38.

Figure 2:
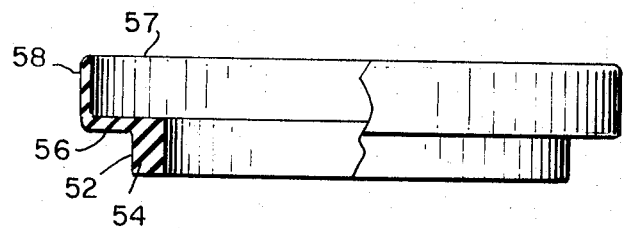
FIG. 2 is a view partly in section showing a second form of a piston seal which may be used in the structure shown in FIG. 1.

Another form of seal ring made in accordance with the present invention is shown in FIG. 2. This second form of seal ring 52 has a body portion 54 which is integral with an outwardly projecting web section 56 at the top of the body portion 54. The web section 56 extends out to an annular vertical wall section 57 which has a sealing surface 58 at its outer periphery.

Figure 3:
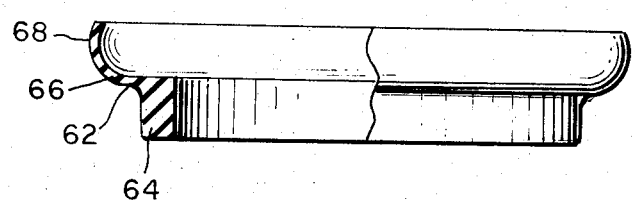
FIG. 3 is a view partly in section of a third form of piston seal which may be used with the present invention.

A third form of the seal ring 62 which can be used in the present invention is shown in FIG. 3. The seal ring 62 has a body portion 64 which is integral with an outwardly curved web section 66 which joins to the body portion 64 at the top thereof. The web section 66 includes at its outer periphery a sealing surface 68.

The principle of all three seal rings shown in the drawings is the same. The sealing surfaces 48, 58, and 68 will move outwardly under pressure from the fluid above the piston 30 leaking around it. This is so because the structure which joins the sealing surface 48, 58, and 68 to the body portions 44, 54, and 64 extends outward and toward the pressure side of the piston 30, that is, toward the piston face 50, that is under pressure.

The foregoing describes but one preferred embodiment, other embodiments being possible without exceeding the scope of the present invention as defined in the following claims.

What is claimed is:

1. In combination a piston and cylinder comprising;

a cylinder having a cylinder head and a cylinder wall, said cylinder wall having a first cylindrical portion, said first portion being of a first inside diameter over its entire length and an axially disposed second cylindrical portion, said second portion being of a second inside diameter over its entire length, said second inside diameter being less than said first inside diameter, a piston, a groove encircling said piston, a seal ring mounted in said groove, said seal ring having an inside diameter greater than the inside diameter of said groove, a sealing surface at the outer periphery of said seal ring, said sealing surface having an outside diameter less than that of said first inside diameter but substantially equal to said second inside diameter, whereby when said piston moves axially in said cylinder away from said cylinder head portion, said sealing surface does not engage with said cylinder wall while said sealing surface is adjacent to said first portion but may move laterally slightly to completely engage against said second portion of said cylinder wall as said sealing surface slides over said second portion to thereby provide a seal.

2. The combination defined in claim 1 wherein said seal ring is of flexible material, comprises an annular body section, an outwardly extending web section connected with said body section and a sealing surface of a greater outside diameter than the outside diameter of said body section, said sealing surface being connected with said web section.

3. The combination defined in claim 2 wherein said web section extends outwardly and toward said cylinder head.

4. The combination defined in claim 2 wherein said web section extends generally radially outward from said body section to a wall section which extends generally parallel to the longitudinal axis of said cylinder with said sealing surface on the outer periphery of said wall section.

5. The combination defined in claim 2 wherein said web section is an annular curved section concave in the direction of said cylinder head.

* * * * *